Sept. 16, 1958  J. A. KETOLA ET AL  2,852,128
TRIPPER FOR BELT CONVEYORS
Filed Aug. 7, 1957  7 Sheets-Sheet 5

United States Patent Office 2,852,128
Patented Sept. 16, 1958

2,852,128

TRIPPER FOR BELT CONVEYORS

Jarl A. Ketola and John E. Petersen, both of Johannesburg, Transvaal, Union of South Africa, assignors to Link-Belt Company, a corporation of Illinois Application August 7, 1957, Serial No. 676,879

15 Claims. (Cl. 198—186)

This invention relates to new and useful improvements in trippers for belt conveyors and deals more particularly with belt-propelled trippers having automatically controlled traversing movements.

It is the primary object of this invention to provide a belt-propelled tripper, the direction of movement of which is automatically reversible at each end of its path of travel with a minimum of shock to the driving mechanism.

A further important object of the invention is to provide a belt conveyor tripper the movement of which is so controlled as to eliminate any danger that the tripper will travel beyond the ends of a selected path of reciprocating movement.

Still another important object of the invention is to provide a belt-propelled tripper, the direction of movement of which is controlled by alternately driving either of two parts that are rotated in like directions but have different angular velocities.

Another important object of the invention is to provide an automatically controlled belt-propelled tripper, the drive of which is so designed as to require a minimum of supervision and maintenance.

Other objects and advantages of the invention will be apparent during the course of the following description.

In the accompanying drawings, forming a part of this specification, and in which like reference characters are employed for designating like parts throughout the same.

Figure 1:
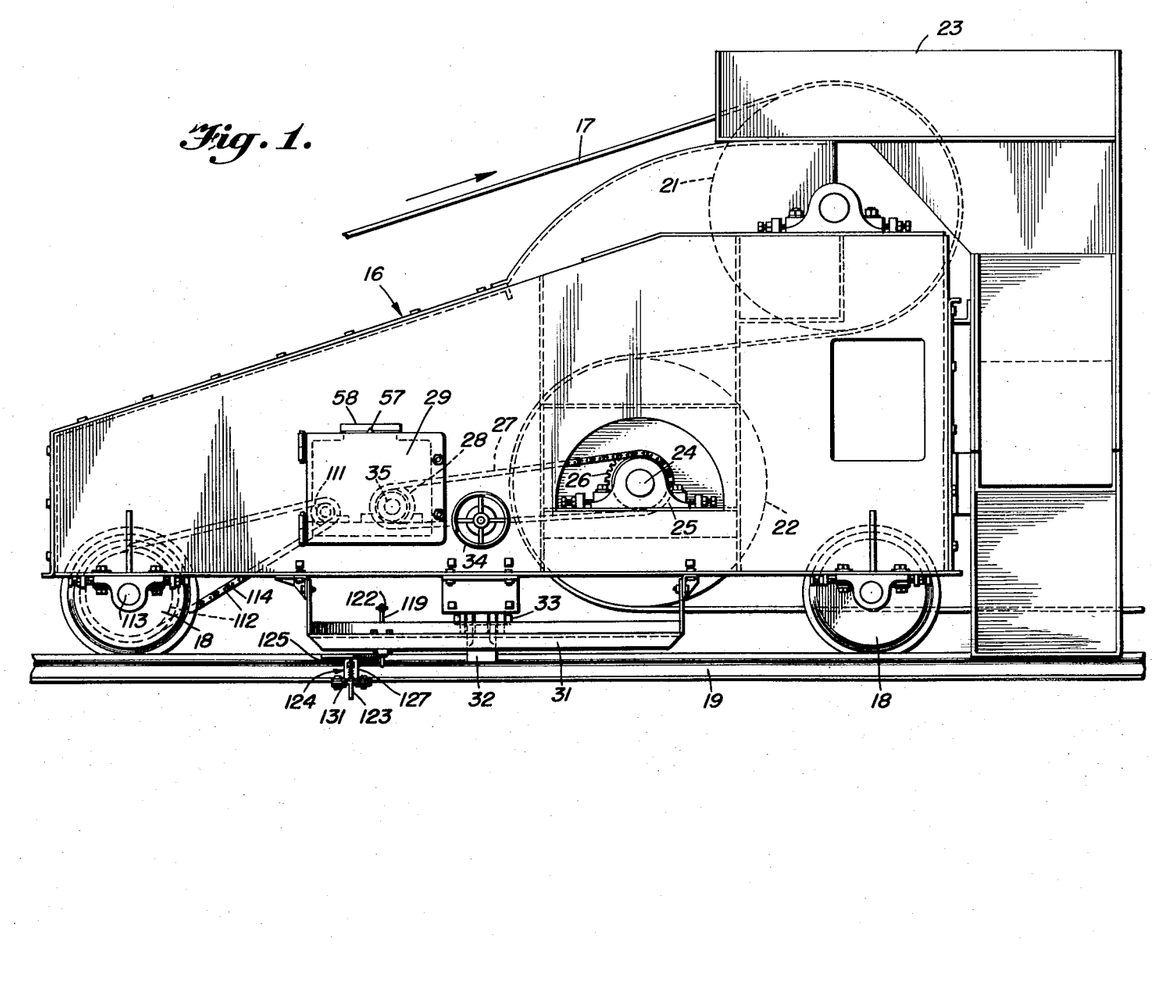
Figure 1 is a side elevational view of a belt conveyor tripper embodying the invention.
Figure 2:
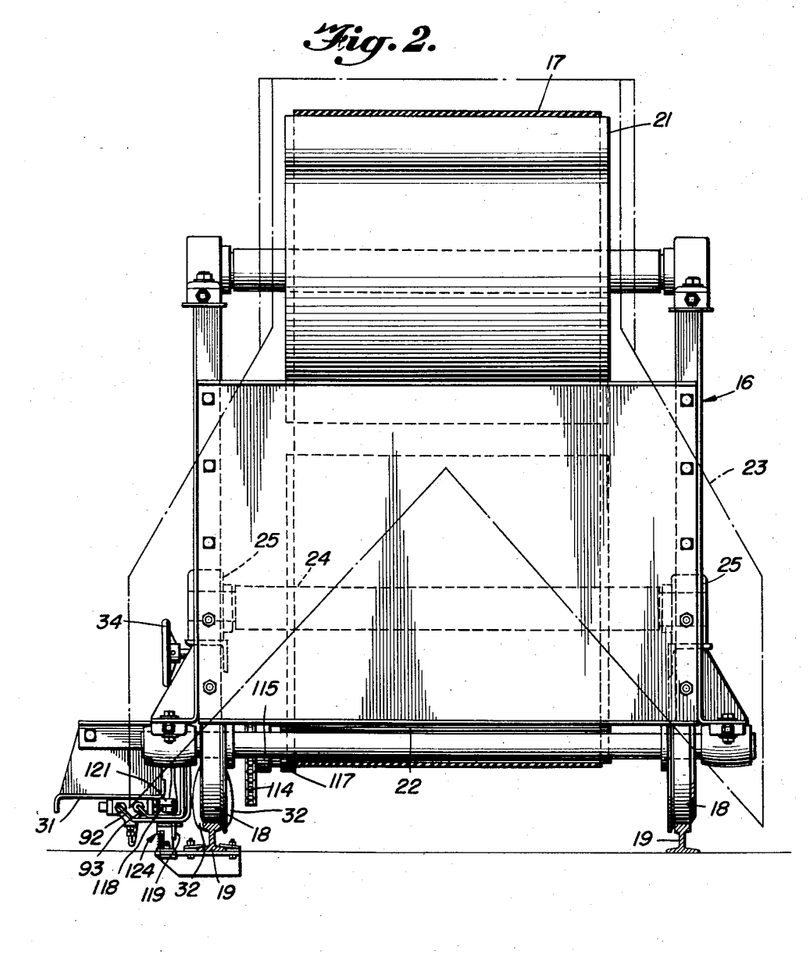
Figure 2 is an end elevational view of the tripper shown in Fig. 1.

In the drawings, wherein for the purpose of illustration is shown the preferred embodiment of the invention, and first particularly referring to Figs. 1 and 2, there is shown a belt conveyor tripper designated in its entirety by the reference character 16. This tripper is mounted for movement along the active run of a conveyor belt 17 and is supported for such movement by flanged wheels 18 which rest upon and are guided by rails 19. It will be understood, of course, that the rails 19 are positioned in overlying relationship with a storage space so that material removed from the belt 17 by the tripper 16 will be discharged into the storage space along the path of the belt by movement of the tripper along the rails.

As is best illustrated in Fig. 1, the tripper 16 has mounted thereon a pair of pulleys 21 and 22 which rotate about spaced parallel axes that are normal to the direction of movement of the tripper and are both vertically and horizontally staggered. The belt 17, which travels in the direction of the arrow in Fig. 1, will approach the pulley 21 along an upwardly inclined path. After being looped around the pulley 21, the belt travels rearwardly therefrom relative to its original direction of movement, and is then looped around the pulley 22 so that it will continue in its original direction of movement after leaving the bottom of pulley 22. That portion of the belt 17 which passes around the pulley 21, therefore, forms an elevated loop from which the material carried by the belt will be discharged into the hopper 23. As illustrated by broken lines in Fig. 2, the hopper 23 forms a divided flow path so as to discharge material therefrom laterally outwardly and on opposite sides of the tripper 16.

The shaft 24 of the pulley 22 has its opposite end portions journalled in bearing blocks 25 at opposite sides of the tripper 16 to support the shaft and pulley for rotation on the frame. As illustrated in Fig. 1, the shaft 24 also has rigidly mounted thereon a sprocket 26 for rotation therewith when the belt 17 is moved around the pulley 22. A drive chain 27 is trained around the sprocket 26 and around a sprocket 28 for operating the tripper drive as will be later described. A door 29 is provided at the side of the tripper 16 adjacent the sprocket 28 for access to the tripper drive and an operator's platform 31 is mounted on and extends outwardly from the same side of the tripper. A pair of clamping members 32 are pivotally supported on the bottom of the tripper 16 by a pin 33 and a hand wheel 34 is provided for imparting pivotal movement to the clamping members to cause the lower end portions thereof to engage opposite sides of one of the rails 19 to thereby prevent, when desired, any movement of the tripper along the rails.

Figure 3:
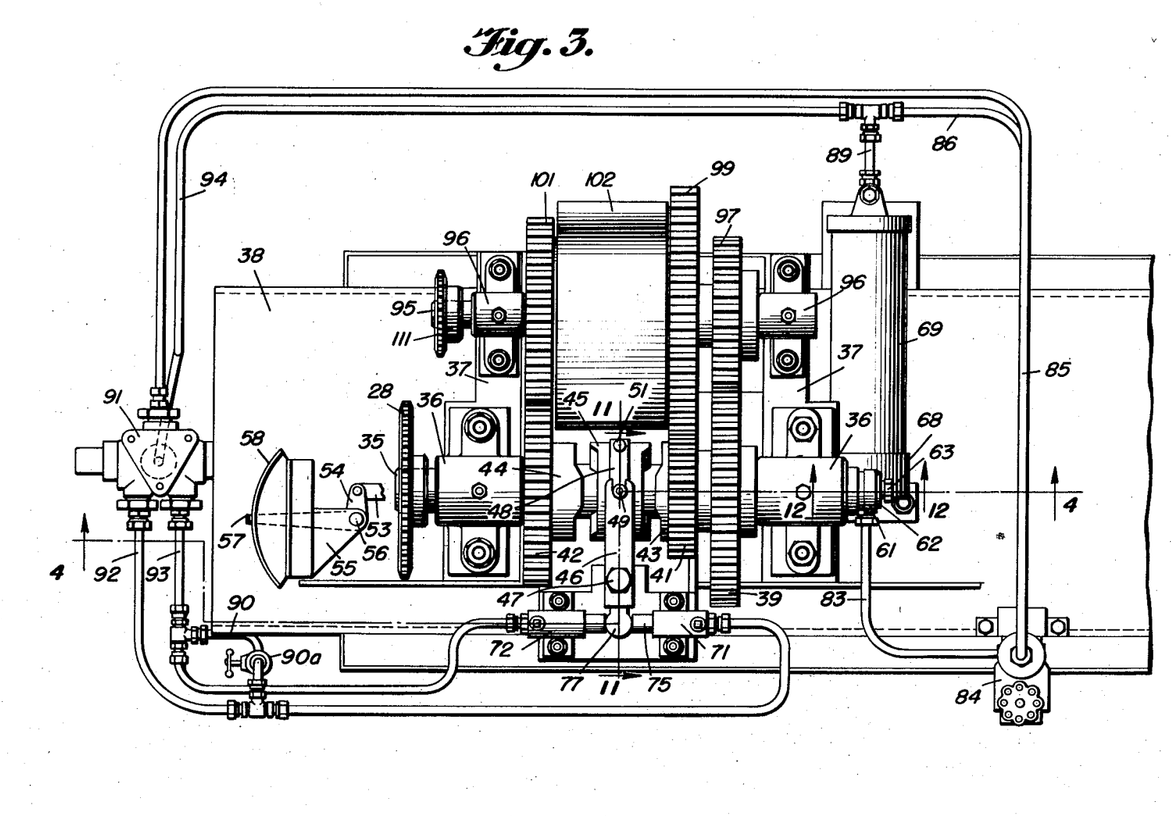
Figure 3 is a top plan view of the drive employed by the tripper of Fig. 1 and the control therefor.
Figures 4, 5, 6:
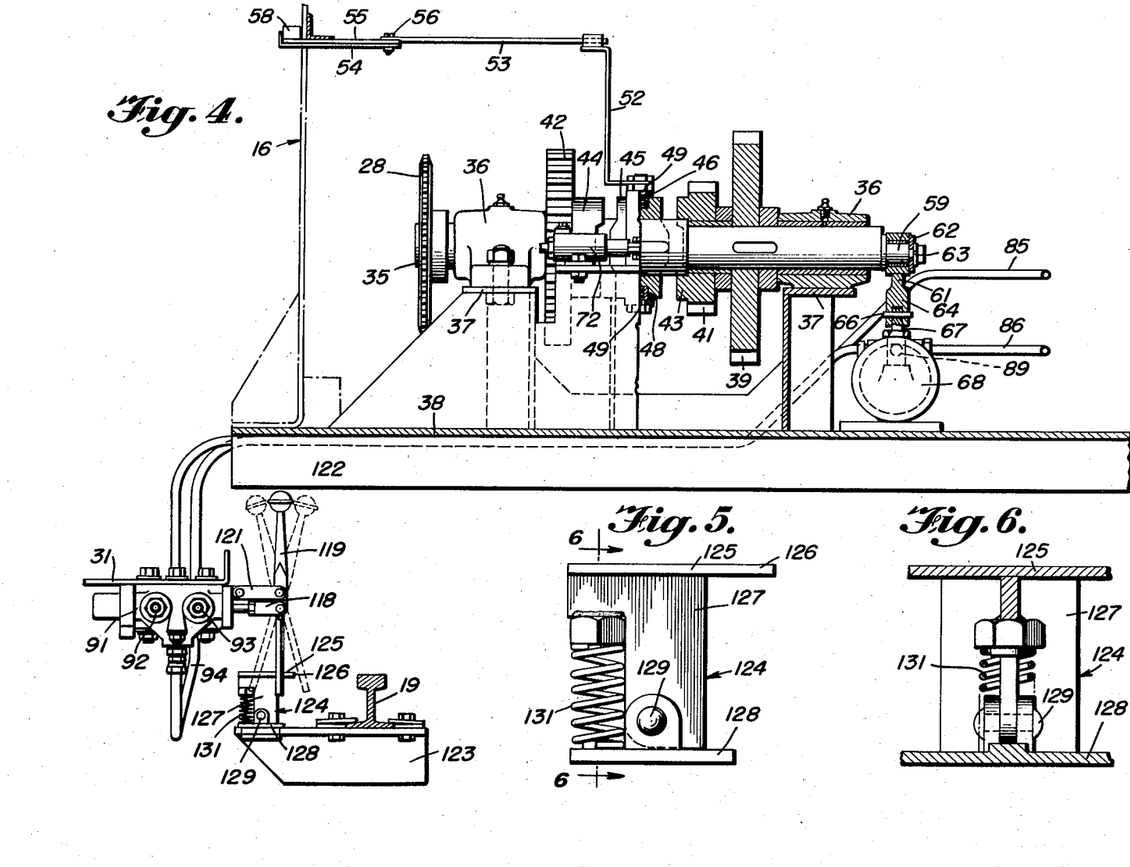
Figure 4 is a vertical sectional view taken on line 4—4 of Fig. 3.
Figure 5 is an enlarged elevational view of one of the control valve operating cams employed in the control of the tripper drive.
Figure 6 is a vertical sectional view taken on line 6—6 of Fig. 5.
Figure 11:
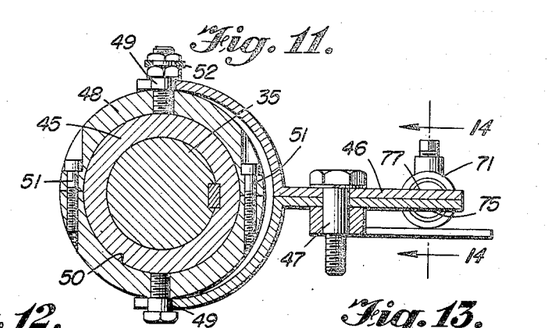
Figure 11 is a vertical sectional view taken on line 11—11 of Fig. 3.

Referring now to Figs. 3 and 4 for a detail description of the drive for imparting traversing movements to the tripper 16 alternately in opposite directions along the rails 19, it will be seen in Figs. 3 and 4 that the sprocket 28 is suitably fixed to a shaft 35 that is journaled in bearings 36 which are supported on pedestals 37 of a base 38. A gear 39 is keyed to the shaft 35 and gears 41 and 42 are rotatably supported at axially spaced positions along the shaft 35. The adjacent sides of the two gears 41 and 42 are provided with collars 43 and 44, respectively, the opposed radial surfaces of which are irregularly formed to provide clutch faces for cooperating with the jaw clutch member 45 keyed to the shaft 35 for rotation therewith and for axial movement thereon. The radial surfaces at opposite sides of the member 45 are irregularly formed to provide clutch faces which complement the clutch faces of the collars 43 and 44. Axial movement of the member 45 into engagement with either the collar 43 or the collar 44, therefore, will cause the shaft 35 to rotate the gear associated with the collar 43 or 44 that is engaged by the clutch member 45. Axial movement is imparted to the clutch member 45 by an operating lever 46 that is supported for pivotal movement about the pin 47 and has a forked end portion pivotally connected to a slip ring 48 by pins 49, as best illustrated in Fig. 11. The slip ring 48 is seated in a peripheral groove 50 around the clutch member 45 to permit free rotation of the clutch member relative to the ring while maintaining a selected one of the opposed faces of the clutch member and the corresponding one of the collars 43 and 44 in driving engagement with each other. It will be noted that the slip ring 48 is diametrically split, the two halves of the ring being joined by cap screws 51, so that the ring may be readily assembled on the clutch member 45.

As is best illustrated in Fig. 4, the upper pin 49 of the slip ring 48 has pivotally connected thereto a vertically extending arm 52, the upper end portion of which is rigidly connected to a link 53 which extends outwardly therefrom in generally parallel relationship with the axis of the shaft 35. The outer end of the link 53 is pivotally connected to one arm of a bell crank 54 supported for pivotal movement on a bracket 55 by a pin 56. The other arm of the bell crank 54 is provided with a pointer 57 that is movable along an arcuate scale 58 for indicating the position of the clutch member 45. In other words, as the clutch member 45 moves axially of the shaft 35, the arm 52 will move the link 53 to pivot the bell crank 54 so that the pointer 57 will move along the scale 58.

Figure 12:
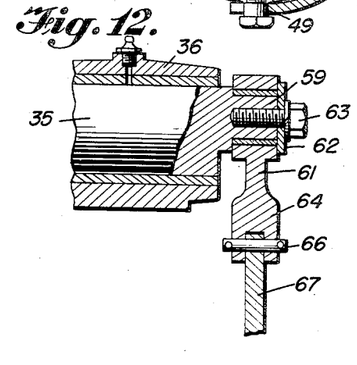
Figure 12 is a vertical sectional view taken on line 12—12 of Fig. 3.
Figure 13:
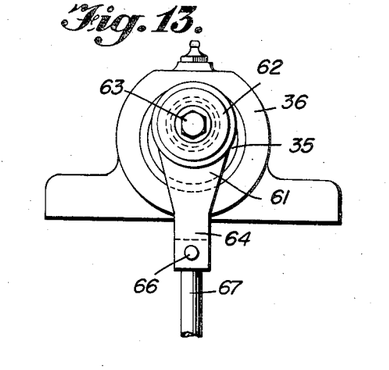
Figure 13 is a fragmentary end elevational view of the cam for operating the pump of the hydraulic control circuit.

As is best illustrated in Figs. 12 and 13, the end portion of the shaft 35 opposite the sprocket 28 is provided with an eccentric portion 59 which functions as a crank and is bushed for rotation relative to one end portion of a connecting rod 61 which is mounted thereon. The connecting rod 61 is retained in its proper position on the eccentric 59 by a washer 62 that is connected to the end of the shaft 35 by a cap screw 63. The opposite end portion of the connecting rod 61 is provided with a clevis 64 which is pivotally connected by a pin 66 to the operating plunger 67 of a reciprocating type pump 68, as illustrated in Figs. 3 and 4. The pump 68 is of a conventional design and includes a fluid reservoir 69.

Figures 14, 15:
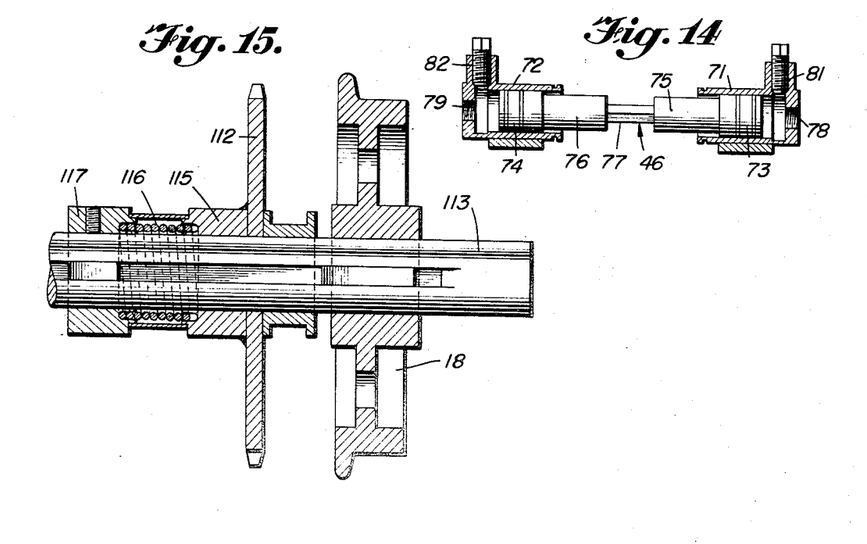
Figure 14 is a vertical sectional view taken on line 14—14 of Fig. 11.
Figure 15 is a sectional view showing the mounting of the driven sprocket on the tripper axle.

Referring now to Fig. 3, it will be seen that pivotal movement is imparted to the lever 46 for moving the clutch member 45 to position one of its clutch faces in driving engagement with the complementary clutch face of the collar 43, or the collar 44, by a pair of reciprocating fluid motors 71 and 72. As is best illustrated in Fig. 14, the two fluid motors 71 and 72 have pistons 73 and 74, respectively, the outer ends of which have plungers 75 and 76 mounted thereon for engaging the opposite sides of the end portion 77 of the lever 46 which is positioned therebetween. The sides of the end portion 77 of the lever 46 are arcuately formed to permit pivotal movement of the lever relative to the plungers 75 and 76 of the pistons 73 and 74 when the pistons are reciprocated by the alternate admission of pressure fluid through and release of pressure fluid from the inlet ports 78 and 79 of the motors 71 and 72, respectively. Normally closed bleed ports 81 and 82 are provided for releasing air from the chambers of the two motors 71 and 72, respectively, when the hydraulic system of the drive is initially put into operation.

Referring once again to Figs. 3 and 4, it will be seen that the pressure outlet of the pump 68 is connected by a pipe 83 to the inlet of a pressure relief valve 84, the pressure port of which is connected to a pipe 85 and the release port of which is connected to a pipe 86. The pipe 86 is in turn connected through a pipe 89 to the reservoir 69 associated with the pump 68 for returning the released fluid to the reservoir. The pipe 85 is connected to the inlet port of a control valve 91 which is of conventional design and directs the flow of pressure fluid from the pipe 85 into a selected one of the two pipes 92 and 93 which are connected to the inlet ports 78 and 79 of the motors 71 and 72, respectively. The manner in which the control valve 91 is automatically operated to control the flow of pressure fluid to a selected one of the pipes 92 or 93 will be more fully described at a later time, but it will be noted at this point that the operation of the valve to direct the flow of pressure fluid to either of the pipes will simultaneously release fluid from the other pipe for return through the pipe 94 to the pipe 89 and into the reservoir 69 associated with the pump 68. It will also be noted that a bypass pipe 90 extends between and connects the two pipes 92 and 93. The bypass pipe 90 is normally closed by a valve 90a, but may be opened to equalize the pressure of the fluid supplied to the two fluid motors 71 or 72. The lever 46 thereupon will be free to be pivoted by movement of the clutch member 45 to disengage the radial surface at either side thereof from the complementary face of the collar 43 or 44 with which it has been drivingly engaged.

As illustrated in Fig. 3, a second shaft 95 is rotatably supported on the pedestals 37 of the base 38 by bearings 96. By reference to Fig. 9, it will be seen that the shaft 95 has mounted thereon a gear 97 which meshes with the gear 39 of the shaft 35 and is keyed to a collar 98 that is in turn rotatably supported on the shaft 95. A gear 99 is rotatably supported on the collar 98 in meshed relationship with the gear 41 and a gear 101 is mounted on one side of a housing 102 in meshed relationship with the gear 42. The housing 102 extends from the gear 101 longitudinally of the shaft 95 for rigid connection to the gear 99. Within the housing 102, the collar 98 has a gear 103 formed thereon and a similarly sized gear 104 is keyed to the shaft 95 for rotation therewith, the two gears 103 and 104 being spaced axially by the collar 105 of the gear 104.

Figure 10:
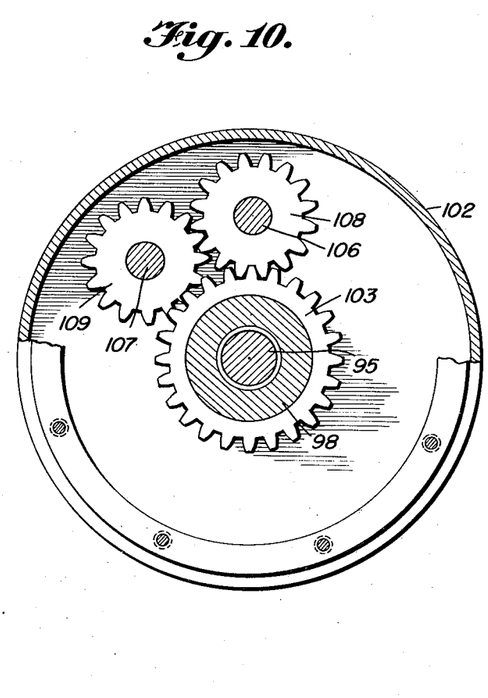
Figure 10 is a transverse sectional view taken on line 10—10 of Fig. 9.

As illustrated in Fig. 10, a pair of shafts 106 and 107 extend between the opposite sides of the housing 102 and have mounted for free rotation thereon gears 108 and 109, respectively. The gear 108 meshes with the gear 103 and the gear 109 meshes with the gear 104 and the two gears 108 and 109 are meshed with each other radially outwardly of the collar 105 so that the two gears 108 and 109 form a compound planetary gear set which is supported for movement through its orbital path by the housing 102. On end of the shaft 95 has mounted thereon a sprocket 111, see Fig. 3.

By reference to Figs. 1 and 15, it will be seen that the sprocket 111 is drivingly connected to a sprocket 112 on the axle 113 of the tripper 16 by a drive chain 114. As is best illustrated in Fig. 15, the hub 115 of the sprocket 112 is connected to the shaft 113 through a coil spring 116 and a collar 117 that is fixed on the shaft. In other words, driving forces are transmitted from the sprocket 112 to the shaft 113 through the spring 116 so as to minimize the shock forces applied to the axle 113 when the direction of rotation of the sprocket 112 is reversed. The wheels 18, of course, are keyed to the shaft 113 so that alternate rotation of the sprocket 112 in opposite directions will impart alternate movements to the tripper 16 in opposite directions along the path defined by the rails 19.

Referring now to Figs. 1 and 4 to 8, inclusive, for a detail description of the apparatus for automatically controlling the operation of the valve 91 to reverse the direction of movement of the tripper 16 at the opposite ends of its selected path of travel, it will be seen that the valve is mounted on the underside of the operator's platform 31 at one side of the tripper. A plunger 118 for operating the valve 91 projects inwardly from the valve and is pivotally connected to an operating lever 119 which is supported for pivotal movement by a link 121. By reference to Fig. 4, it will be seen that pivotal movement of the lever 119 will effect reciprocating movement of the valve operating plunger 118 to direct the flow of pressure fluid through the valve 91 to a selected one of the pipes 92 or 93. At the upper end of the lever 119 there is provided a knob 122 for convenience in manually operating the valve 91 and the lower end portion of the lever projects downwardly into laterally spaced relationship with the rail 19.

Mounted on the rail 19 adjacent the operator's platform 31 and at each end of the desired path of traversing movement of the tripper 16 is a bracket 123 which projects laterally outwardly from the rail beneath the path of travel of the lever 119 as the tripper moves along the rails. At the outer end portion of each bracket 123 there is provided a cam assembly 124 which includes a cam plate 125 having a camming surface 126 that projects arcuately into the path of travel of the operating lever 119. As illustrated in Figs. 5 and 6, each of the cams 124 also includes a body portion 127 that is pivotally mounted on a base plate 128 by means of a pin 129 and is urged into an upright position by a spring 131. The cam plate 125 may be laterally deflected, therefore, by pivotal movement of the body member 127 against the force of the spring 131 when the lever 119 moves along the camming surface 126. Although the reversal of the tripper travel is substantially simultaneous with the operation of the control valve lever 119 by the camming surface 126, it is apparent that a small amount of tripper overtravel past the switching point will occur, owing to the time required for transmitting the changed hydraulic pressures to the motors 71 and 72 and for movement of the clutch member 45 from engagement with one of the collars 43 and 44 into engagement with the other collar. The deflectable nature of the cam plate 125, therefore, prevents damage to the lever 119 during the period of slight tripper overtravel by permitting movement of the cam plate from the path of the lever after the lever has been moved to a maximum position by the cam.

Figure 7:
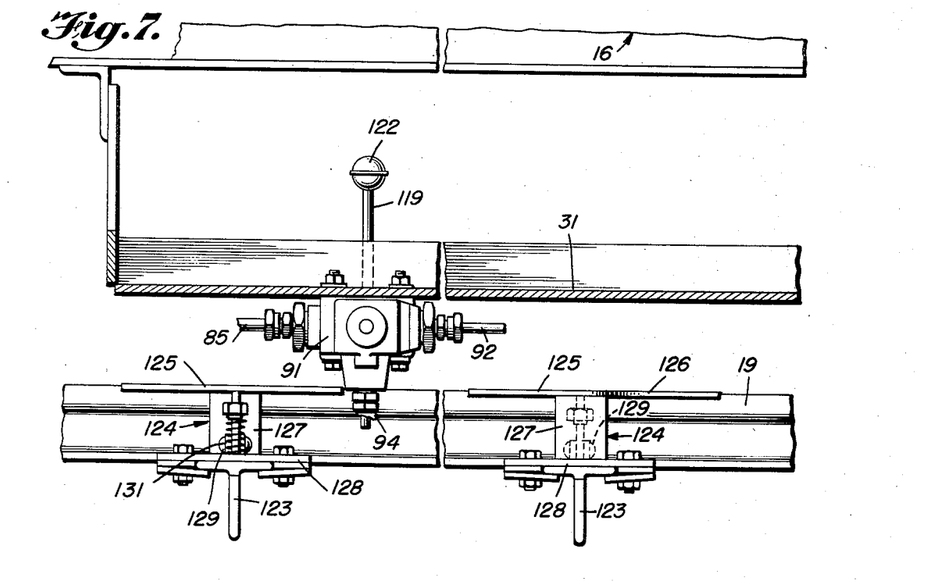
Figure 7 is a vertical sectional view taken on line 7—7 of Fig. 8.
Figure 8:
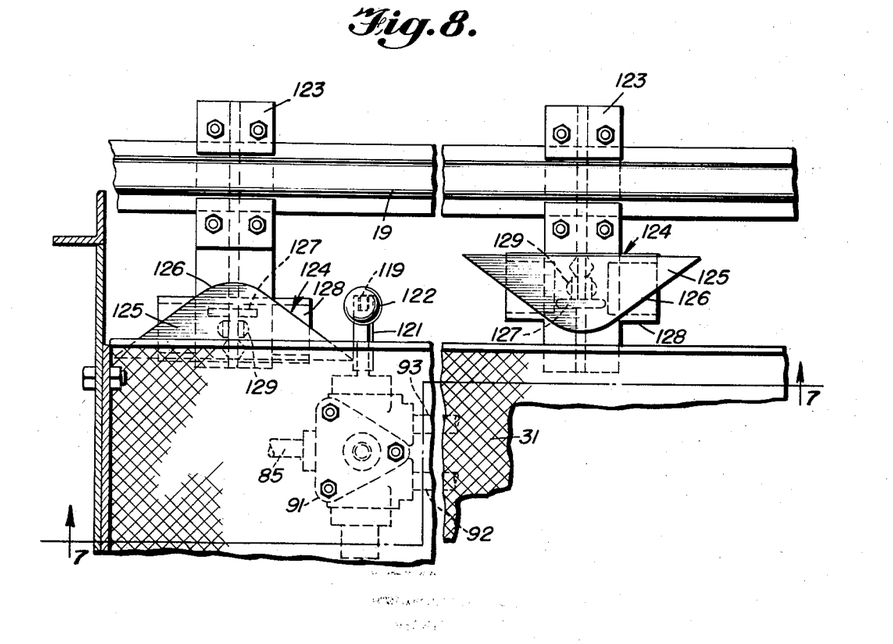
Figure 8 is a fragmentary top plan view of the control valve and the operating cams therefor.

By reference to Figs. 7 and 8, it will be seen that the cam assemblies 124 at opposite ends of the path of travel of the tripper 16 are identical but are mounted on their associated brackets 123 with their camming surfaces 126 facing in opposite directions. Movement of the lever 119 past the camming surface 126 of the cam assembly 124 at one end of the path of movement of the tripper 16, therefore, will pivot the lever 119 in a direction to move the plunger 118 inwardly and movement of the lever past the camming surface at the opposite end of the path of travel of the tripper will pivot the lever in a direction to move the plunger outwardly. In other words, the lever 119 is moved into one tilted position, as illustrated by broken lines in Fig. 4, by movement of the lever past one of the camming surfaces 126 and will be moved into an oppositely tilted position, also illustrated by broken lines in Fig. 4, by movement of the lever past the camming surface of the cam assembly 124 at the opposite end of the path of travel of the tripper so that the supply of pressure fluid to the pipes 92 and 93 is automatically reversed by the valve 91 at each end of the path of travel.

The pressure fluid supplied through the pipes 92 and 93, therefore, will alternately energize the fluid motors 71 and 72 to shift the lever 46 and the clutch member 45 for alternately effecting driving engagement between one face of the clutch member 45 and the collar 43 and between the opposite face of the clutch member and the collar 44. Of course, opening of the valve 90a will cause pressure fluid delivered to either of the pipes 92 or 93 to be released through the other pipe so that the pressure of the fluid in both of the fluid motors 71 and 72 is equalized to permit the clutch member 45 to assume a position between the collars 43 and 44 at which no rotational movement will be imparted to either of the two gears 41 or 42.

Referring now to Figs. 1, 3, 9 and 10 for a detail description of the operation of the drive for imparting movement to the tripper 16, it will first be assumed that all directions of rotations of the rotating members are given as viewed from the operator's side of the tripper or from the left as illustrated in Fig. 3. Further, it will be assumed that the sprocket 28 is to be driven at an arbitrary speed of, for example, 20 R. P. M in a counterclockwise direction. Since the gear 39 is keyed to the same shaft 35 the same as sprocket 28, it will be readily apparent that this gear will be rotated at a corresponding speed of 20 R. P. M. in a counterclockwise direction and that the gear 97, which is meshed with the gear 39, will be rotated in a clockwise direction and at a speed which is directly proportional, for a constant speed of the gear 39, to the ratio of the diameter of gear 39 to the diameter of gear 97. For example, if the gear 39 has a diameter which is one and one-half times that of the gear 97, rotation of the gear 39 at a speed of 20 R. P. M. will rotate the gear 97 at a speed of 30 R. P. M. Similarly, a diametric ratio of one-to-two between the gear 41 and the gear 99 will cause the gear 99 and its associated housing 102 to be rotated at a speed of 10 R. P. M. in a clockwise direction when the clutch member 45 is moved into engagement with the collar 43 so that the gear 41 is rotated at a speed of 20 R. P. M. by the shaft 35. If the gear 42 and the gear 111 bear a diametric ratio of one-to-one, movement of the clutch member 45 into engagement with the collar 44 will cause the housing 102 to be rotated in a clockwise direction and at a speed of 20 R. P. M.

Figure 9:
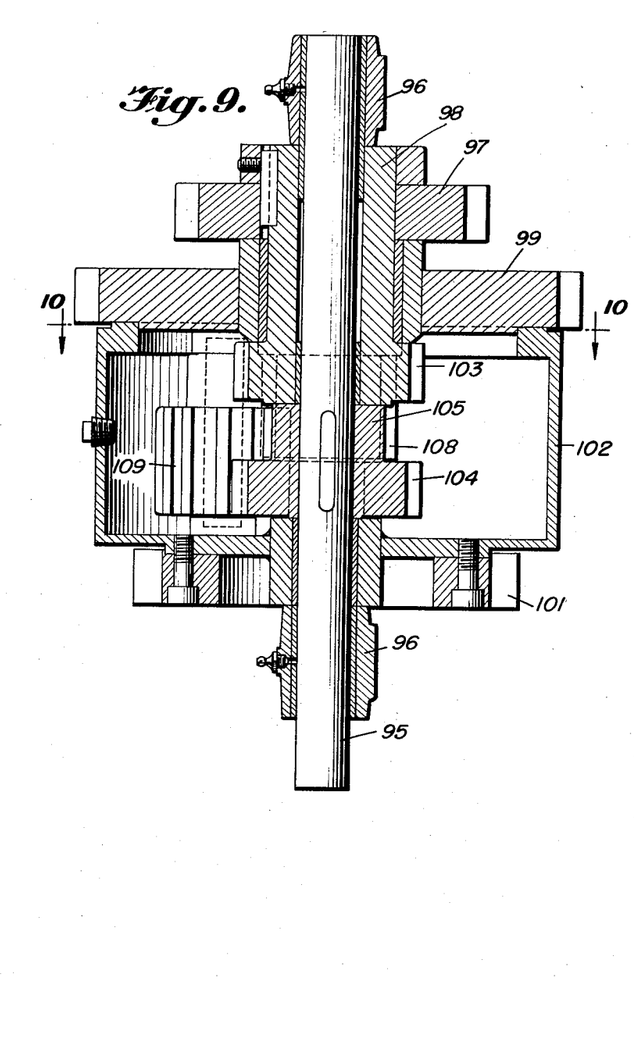
Figure 9 is a longitudinal sectional view of the differential gearing employed in the tripper drive.

Referring now to Figs. 9 and 10, it will be readily apparent that rotation of the gear 97 in a clockwise direction and at a speed of 30 R. P. M. will cause the rigidly connected gear 103 to be rotated at the same speed and in the same direction. If the housing 102 were to be held in a stationary position, this rotation of the gear 103 in a clockwise direction would be transmitted to the gear 104 through the two planetary gears 108 and 109, which would rotate on their shafts 106 and 107 in a counterclockwise and clockwise direction, respectively. The gear 104 and shaft 95, therefore, would be rotated in a counterclockwise direction and at a speed of 30 R. P. M. which is equal to that of the gear 103.

The above described operation of the planetary gear train is modified, however, by rotation of the housing 102 and this modified operation can best be understood by assuming first that the gear 97 and its connected gear 103 are maintained in a stationary position while the housing 102 is rotated in a clockwise direction. It will be readily apparent that if no driving connection were provided between the gear 103 and its associated gear 108, and the gear 109 were held against rotation on its shaft 107, one revolution of the housing 102 would impart one revolution to the gear 104 which is meshed with the gear 109. Since the gear 108 is meshed with the gear 103, however, the gear 108 will be rotated in a clockwise direction on its shaft 106 during the one revolution of the housing 102 and this rotation of the gear 108 will cause the gear 109 to be rotated in a counterclockwise direction to impart additional rotational movement to the gear 104 in a clockwise direction. Since the gears 108 and 109 are of equal diameter as are the gears 103 and 104, it will be readily apparent that this additional rotational movement will equal one revolution and will cause each revolution of the housing 102 in a clockwise direction to impart two revolutions to the gear 104 in a similar direction. Still assuming that the gear 97 and its connected gear 103 are to be held in a stationary position, therefore, rotation of the gear 99 in a clockwise direction at a speed of 10 R. P. M. will cause the shaft 95 to be rotated in a clockwise direction at a speed of 20 R. P. M. and rotation of the gear 101 at a speed of 20 R. P. M. in a clockwise direction will impart a clockwise rotation to the shaft 95 at a speed of 40 R. P. M.

The net effect of rotation of the gear 97 and its connected gear 103 and one or the other of the two gears 99 or 101, therefore, will be the sum of the counterclockwise rotation imparted to the shaft by the gear 97 and the clockwise rotation imparted to the shaft 95 by either the gear 99 or the gear 101. Since the gear 97 rotates the shaft 95 at a speed of 30 R. P. M. in a counterclockwise direction, rotation of the shaft in a clockwise direction at a speed of 20 R. P. M. by the gear 101 will have the net effect of rotating the shaft at a speed of 10 R. P. M. in a counterclockwise direction. If the counterclockwise rotation of the shaft 95 by the gear 97 is modified by rotation of the shaft by the gear 99 at a speed of 40 R. P. M. in a clockwise direction, however, the net rotation of the shaft will equal 10 R. P. M. in a clockwise direction. In other words, the shaft 95 will rotate at a speed of 10 R. P. M. in a clockwise direction when the clutch member 45 engages the collar 44 and will rotate at the same speed in a counterclockwise direction when the clutch member engages the collar 43. Reversals in the direction of rotation of the shaft 95, therefore, are effected by changes in the speed but not the direction of rotation of the housing 102.

When it is desired that the tripper 16 be maintained in a stationary position on the rails 19, the clutch member 45 is spaced from the two collars 43 and 44 so that neither gear 99 nor 101 is driven and the housing 102 is freed for rotation independently of the shaft 35. Of course, when the tripper 16 is at rest, the shaft 95, and the gear 104 keyed thereto, will remain in a stationary position. Continued operation of the gear 97, however, will cause the gear 103 to rotate the associated planetary gear 108 which will in turn rotate the gear 109 to cause the latter to move through its obital path around the stationary gear 104. Movement is imparted to the housing 102, therefore, at a speed equal to twice that of the gear 103 and in a clockwise direction.

From the above described operation of the differential gear train employed in the drive for the tripper 16, it will be apparent that the shaft 95 and sprocket 111 will be driven alternately in opposite directions and at a speed equal to one-half the speed of rotation of the shaft 35 and the sprocket 28 keyed thereto. Any suitable combination of sprockets 26—28 and 111—112 may be employed, therefore, for transmitting power to and from the two shafts 35 and 95, respectively. By way of example, if the tripper 16 is to be driven at a velocity of approximately thirty-five feet per minute and the wheels 18 on the axle 113 are fourteen inches in diameter, the axle must be rotated at a speed of 10 R. P. M. by its sprocket 112. Assuming that the sprocket 112 has forty-five teeth and the sprocket 111 has thirteen teeth, the sprocket 111 must be rotated at a speed of approximately 35 R. P. M. to move the tripper with a linear velocity of thirty-five feet per minute along the rails 19. If the sprocket 111 rotates at a speed of 35 R. P. M., however, the sprocket 28 must be rotated at a speed of 70 R. P. M. due to the two-to-one relationship described in connection with the differential gear drive. Assuming that the belt 17 moves over the pulleys 21 and 22 with a linear velocity of three hundred feet per minute, the pulleys will rotate at a speed of approximately 50 R. P. M. when their diameters are equal to two feet. The speed of rotation of the sprocket 26, therefore, is 50 R. P. M. and this sprocket must have a diameter approximately 1.4 times as great as that of the sprocket 28 to impart a speed of rotation to the latter sprocket of 70 R. P. M. With this combination of sprockets, the tripper 16 will be moved along the rails 19 at the selected speed of approximately thirty-five feet per minute.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, we claim:

1. A belt conveyor tripper, comprising a wheeled carriage mounted for movement along a fixed path and having pulleys mounted thereon around which the conveyor belt is trained and which are rotated by the belt, a gear train including planetary gear means for drivingly connecting one of said pulleys and at least one wheel of said carriage, said planetary gear means being revolvingly driven by said one pulley in an orbital path in one direction only and in accordance with the direction of rotation of said one pulley, and means for selectively varying the cyclic rate of unidirectional revolution of said planetary gear means through its orbital path between values at which said driven carriage wheel is alternately rotated in opposite directions and is left in a stationary position.

2. A belt conveyor tripper as defined in claim 1 further characterized by said means for selectively varying the cyclic rate of unidirectional revolution of said planetary gear means comprising a driving member operatively connected to one of said pulleys for rotation thereby, separate driven members operatively connected to said planetary gear means for alternately revolving the latter through its orbit at different cyclic rates, and means for operatively connecting said driving member to a selected one of said driven members to cause said gear train to drive said driven carriage wheel in the desired direction and for interrupting the connection between said driving and driven members to permit said planetary gear means to revolve freely through its orbit while said wheel remains stationary.

3. A belt conveyor tripper as defined in claim 1 further characterized by said gear train comprising a first gear drivingly connected to one of said pulleys for rotation in one direction only and in accordance with the direction of rotation of said one pulley, a second gear drivingly connected to at least one of the wheels of said carriage for rotating the wheel to drive the carriage, and planetary gear means mounted for rotation in meshed relationship with said first and second gears and for revolving movement through an orbital path.

4. A belt conveyor tripper, comprising a wheeled carriage mounted for movement along a fixed path and having pulleys mounted thereon around which the conveyor belt is trained and which are rotated by the belt, a first shaft journaled on said carriage and drivingly connected to one of said pulleys for rotation thereby in one direction only and in accordance with the direction of rotation of said one pulley by said belt, a second shaft journaled on said carriage and drivingly connected to at least one carriage wheel for rotating the wheel to impart movement to said carriage, gear means including planetary gears for drivingly connecting said first and second shafts, and means selectively varying the cyclic rate of revolution of said planetary gears between values at which said second shaft is alternately rotated in opposite directions and is left in a stationary position.

5. A belt conveyor tripper, comprising a wheeled carriage mounted for movement along a fixed path and having pulleys mounted thereon around which the conveyor belt is trained and which are rotated by the belt, a gear train including planetary gear means for drivingly connecting one of said pulleys and at least one wheel of said carriage, a driving member operatively connected to one of said pulleys for rotation thereby, separate driven members operatively connected to said planetary gear means for alternately revolving the latter through its orbit at different cyclic rates, a clutch member movable between positions for connecting said driving member to a selected one of said different driven members and for disconnecting said driving member from all of said driven members, and means for automatically shifting said clutch member between positions for connecting said driving member alternately to the two driven members at the opposite ends of the desired path of travel of the carriage to vary the cyclic rate of the revolutions of the planetary gear means between values at which the direction of rotation of said wheel is reversed at said ends of the path.

6. A belt conveyor tripper as defined in claim 5 further characterized by said clutch member shifting means comprising fluid motor means connected to said clutch member for operating the latter, a pump for supplying pressure fluid to operate said fluid motor means, means drivingly connecting said pump to one of said pulleys for operation by the latter, a valve for controlling the flow of pressure fluid from said pump to said fluid motor means to cause the latter to move said clutch member to a desired position, and means for automatically operating said valve to shift said clutch at the opposite ends of the path of movement of said carriage.

7. A belt conveyor tripper as defined in claim 6 further characterized by said valve operating means comprising a lever mounted on said carriage for movement therewith and connected to said valve for operating the latter in response to pivotal movement of the lever, and a pair of cams mounted at opposite end portions of the path of travel of said carriage for engaging said lever when the carriage moves to each end of its path of travel to operate said valve and to cause the fluid motor means to shift the clutch member to a position for reversing the direction of movement of said carriage.

8. A belt conveyor tripper, comprising a wheeled carriage mounted for movement along a fixed path and having pulleys mounted thereon around which the conveyor belt is trained and which are rotated by the belt, a first gear drivingly connected to one of said pulleys for rotation thereby, a second gear drivingly connected to at least one of the wheels of said carriage for rotating the wheel to drive the carriage, planetary gearing for rotation in meshed relationship with said first and second gears and for revolving movement through an orbital path, means supporting said planetary gearing for said rotation and for said revolving movement, separate drive means alternately connecting said supporting means to one of said pulleys for rotation by the latter to move said planetary gearing through its orbital path, said separate drive means operable to rotate said supporting means at different cyclic rates, and means for selectively actuating said separate driving means.

9. A belt conveyor tripper as defined in claim 8 further characterized by said supporting means comprising a housing arranged in surrounding relationship with and supported for rotation relative to said first and second gears, and said planetary gearing comprising a plurality of gears rotatably mounted in said housing for movement therewith through their orbital paths in meshed relationship with said first and second gears.

10. A belt conveyor tripper as defined in claim 8 further characterized by said separate drive means comprising first and second gear trains each having one gear thereof drivingly connected to said supporting means and an additional gear for driving said one gear, a shaft supporting the driving gear of each train for rotation relative thereto, means drivingly connecting said shaft to one of said pulleys for rotation by the latter, and clutch means for selectively connecting said shaft to one of said driving gears to cause the gear train associated with the driving gear to rotate the supporting means.

11. A belt conveyor tripper, comprising a wheeled carriage mounted for movement along a fixed path and having pulleys mounted thereon around which the conveyor belt is trained and which are rotated by the belt, a first shaft journaled on said carriage and drivingly connected to one of said pulleys for rotation thereby in one direction only and in accordance with the direction of rotation of said one pulley by said belt, a second shaft journaled on said carriage and drivingly connected to at least one carriage wheel for rotating the wheel to impart movement to said carriage, a first gear mounted on said second shaft for rotation relative thereto, means drivingly connecting said first shaft to said first gear for rotating the latter, a second gear rigidly mounted on said second shaft for rotation therewith, a housing mounted on said second shaft for rotation relative thereto, a compound planetary gear mounted in said housing for movement therewith and for rotation relative thereto in meshed relationship with said first and second gears, and means drivingly connecting said first shaft to said housing for rotating the latter on said shaft at a selected speed to control the rate and direction of rotation of said second gear by said first gear through said planetary gear.

12. A belt conveyor tripper as defined in claim 11 further characterized by the means connecting said first shaft to said housing comprising a first pair of drive members, one of said first pair of drive members being rigidly mounted on said housing for rotation therewith and the other being rotatably mounted on said first shaft, a second pair of drive members having a drive ratio that differs from the drive ratio of said first pair of drive members, one of said second pair of drive members being rigidly mounted on said housing for rotation therewith and the other being rotatably mounted on said first shaft, and a clutch member axially shiftable on said first shaft for selectively connecting the shaft to alternate ones of the two drive members that are rotatably mounted on said first shaft.

13. A belt conveyor tripper as defined in claim 12 further characterized by a fluid motor for shifting said clutch member on said first shaft, and a valve for controlling the flow of pressure fluid to operate said fluid motor and to shift said clutch member to a position for drivingly connecting the first shaft and a selected one of the two drive members mounted thereon.

14. A belt conveyor tripper as defined in claim 13 further characterized by means for pressurizing fluid to operate said fluid motor, means drivingly connecting said first shaft to said pressurizing means for operating the latter, and means for delivering the pressurized fluid from said pressurizing means to said fluid motor through said flow controlling valve.

15. A drive for a belt conveyor tripper having a carriage, wheels mounting said carriage for movement along a fixed path, and pulleys mounted on said carriage around which the conveyor belt is trained and which are rotated by the belt, said drive comprising a planetary gear train, said gear train including a first and a second gear mounted for rotation about a selected axis, a carrier member mounted for rotation about said selected axis, and planetary gear means rotatably mounted on said carrier member in meshed relationship with said first and second gears for drivingly connecting the latter, rotation of said first gear in one direction tending to cause rotation of said second gear in a selected direction and rotation of said carrier member in a given direction tending to cause rotation of said second gear in a direction opposite to said selected direction, means for drivingly connecting one of said pulleys and said first gear whereby said first gear is driven in said one direction at a speed directly proportional to the speed of said one pulley, means for drivingly connecting one of said pulleys and said carrier member whereby said carrier is driven in said given direction and at one of two selected speeds each directly proportional to the speed of said one pulley, means for shifting the speed of said carrier member between said two selected speeds, one of said two selected speeds being of a value sufficient to overcome the tendency of said second gear to be rotated in said selected direction by said first gear and the other of said two selected speeds being of a value insufficient to overcome said tendency, whereby said second gear is rotated in alternate directions in accordance with the selected carrier member speed, and means for drivingly connecting said second gear and at least one of said carriage wheels.

References Cited in the file of this patent

UNITED STATES PATENTS

| | | |
|---|---|---|
| 758,810 | Baldwin et al. | May 3, 1904 |
| 847,309 | Baldwin et al. | Mar. 19, 1907 |
| 1,575,655 | Stinson | Mar. 9, 1926 |
| 2,730,228 | Greeley et al. | Jan. 10, 1956 |